Figure 1:
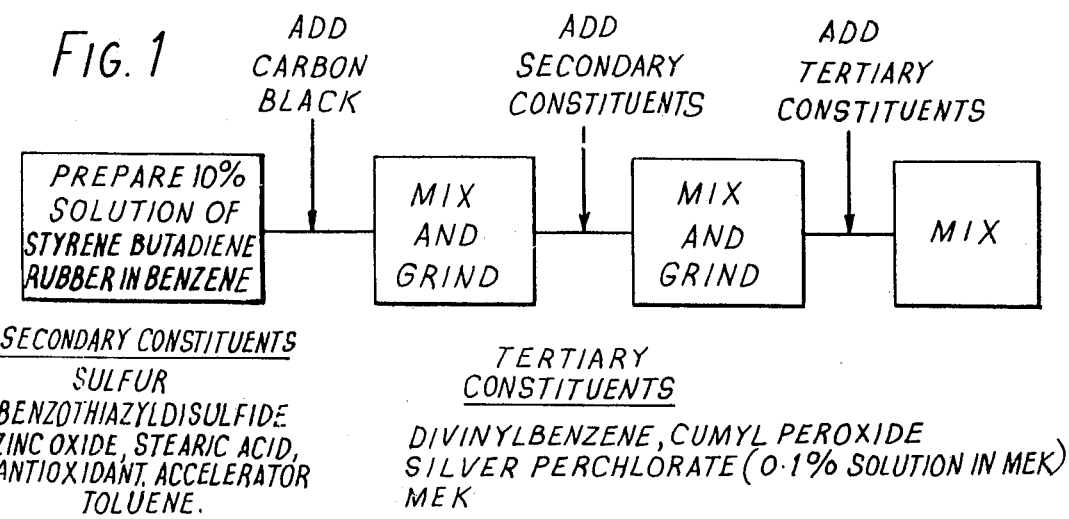

United States Patent [19]
Horowitz et al.

[11] 4,051,090
[45] Sept. 27, 1977

[54] ADHESIVE BONDING

[75] Inventors: Carl Horowitz; Michael Dichter, both of Brooklyn, N.Y.; Navinchandra Bhogilal Shah, Jersey City, N.J.

[73] Assignee: Polygulf Associates, New York, N.Y.

[21] Appl. No.: 535,515

[22] Filed: Dec. 23, 1974

[51] Int. Cl.$^2$ ............................................. C08L 61/06
[52] U.S. Cl. .............................. 260/23.7 M; 156/96; 156/334; 260/879; 260/880 R; 260/894; 428/195; 428/493
[58] Field of Search .................. 260/23.7 R, 23.7 M, 260/880, 879, 894; 428/195, 493; 156/96, 334

[56] References Cited
U.S. PATENT DOCUMENTS 2,755,270  7/1956  Hayes ................................. 260/876
3,741,931  6/1973  Martin et al. ........................ 260/894

*Primary Examiner*—J. Ziegler
*Attorney, Agent, or Firm*—William Anthony Drucker

[57] ABSTRACT

For securing together elastomeric substrates in surface-to-surface contact an adhesive for interposing between the substrates includes elastomer, a prepolymer or a polymerizable monomer, and a graft initiator. Molecular grafting occurs between the elastomer of the adhesive and the elastomer of both of the substrates, and after curing the layer of adhesive forms an integral assembly with the substrates, to result in a bonding strength which is much higher than is obtainable with known surface adhesives. The adhesive is of particular utility in bonding new tread bands to tire casings in the re-capping of used automobile tires.

3 Claims, 3 Drawing Figures

ADHESIVE BONDING

This invention relates to the development of an adhesive for bonding elastomeric substrates together.

Whilst it is not restricted to use in that field, the invention is particularly applicable in the re-capping of motor vehicle tires.

The re-capping of tires involves the removal of the worn tread from the tire casing, and the securing of a new tread band in position by means of adhesive. The joint made between the casing and the new tread band must necessarily be very strong. As at present conventionally carried out, the method requires the removal of the old tread from the tire casing in such a manner as to leave the surface of the tire casing in a roughened state adequate to enhance the grip of the adhesive thereon. The removal of the old tread is carried out by a rasping method which results in the formation of very many fine particles of rubber which are released into the air and cause an air pollution problem.

In order to avoid this problem, a method has been evolved for the knife-cutting of the old tread from the tire casing, but this leaves on the tire casing a relatively smooth surface which does not provide adequate grip for known utilisable adhesives.

It is already known to cause so-called molecular grafting on diverse substrates including nylon, polyester, cellulosics, metals and polyolefins. The substrate is chemically activated at the graft site chemmically bonding vinyl and acrylic monomers in a chair polymerisation, employing either classic free radical or ionic reaction mechanism. Extent of side chain growth is regulated by such classic techniques as residence time in the monomer bath, and chain transfer agents. The monomer bath may consist of an aqueous emulsion or solution medium, a solvent system, or 100% monomer. Typically, the substrate is passed through the monomer bath, then doctored for wet film thickness, and passed through a heat zone for polymerisation. Alternatives to the bath technique are liquid application methods such as spraying, curtain caoting, flow coating, and silk screening. In normal vinyl polymerisation, either a free radical or an ionic mechanism may be employed. ($R, R^1$, etc. are organic or other moieties).

Free Radical

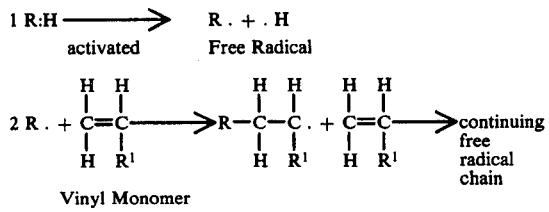

Vinyl Monomer

Ionic

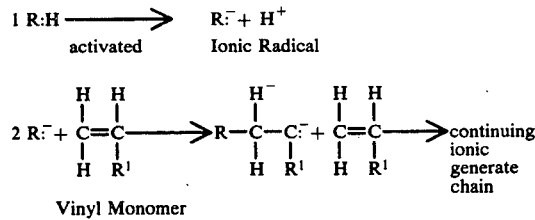

Vinyl Monomer (or R may be positive per $R:H \rightarrow R^+ + :H^-$).

The substrate surface molecules become the site of formation of multiple $R:^-$, $R^+$, or R. groups. The R sites are produced chemically so that chemically linked side chain polymerisation can occur.

Methods of grafting polymerisable monomers onto substrates are set forth in U.S. Pat. Nos. 3,401,049 and 3,698,931 of Polymer Research Corporation of America, the disclosure of which is incorporated herein by reference.

A first object of the invention is to provide an improved adhesive for bonding elastomeric substrates together.

A second object of the invention is to provide an improved method of bonding one elastomeric substrate to another elastomeric substrate, and in particular a method of bonding a tread band to a tire casing.

A third object of the invention is to provide re-capped tires in which a new tread band is secured to the tire casing in an improved manner.

In general terms, the improved adhesive which forms the basis of the invention comprises, in addition to an elastomeric component, a monomer or prepolymer, and a graft initiator.

In the course of bonding a first elastomeric substrate to a second elastomeric substrate, utilising the adhesive between the two substrates, the monomer or prepolymer becomes grafted to both of the substrates and also to the elastomeric component of the adhesive, whereby, after curing, the adhesive layer becomes an integral part of the assembly and provides a higher degree of adhesion than is obtainable with current surface adhesives.

Rubber parts are usually made of synthetic or natural rubber containing diene units, such as butadiene, isoprene, pentadiene and chloroprene. All these units have active labile hydrogen atoms which can be activated in the presence of graft initiators, such as silver, giving rise to free radicals.

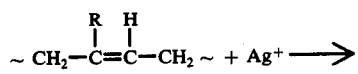

In the presence of vinyl monomers, the rubber radical produced in this process can initiate graft polymerisation.

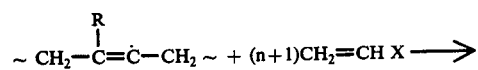

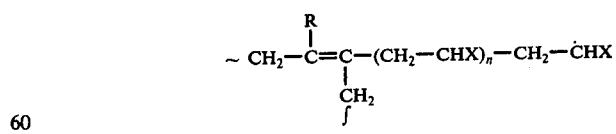

The silver ion then starts the action and thus the whole process behaves like an autocatalytic one. A very small amount of silver ion is therefore sufficient to carry out the process of graft polymerisation. Accelerators such as mercaptobenzo thiazole and thiuram disulfides help in enhancing the rate of curing and vulcanisation. Certain amines, e.g. morpholin, which can migrate into the substrate rubber components fact, help in increasing the adhesion strength.

Since the reaction of the graft initiator is not confined to any particular substrate, the radicals are formed from both the substrate as well as an active elastomeric component of the adhesive. These radicals then undergo termination either by coupling or disproportionation.

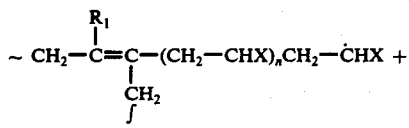

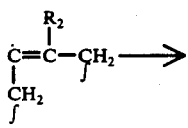

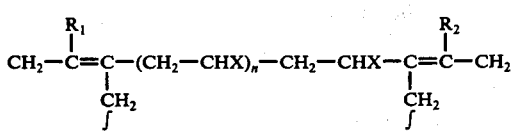

The elastomeric prepolymer component is preferably a polydiene or polydiene copolymer containing pendant vinyl groups and therefore can copolymerise (in the presence of monomer, e.g. divinyl benzene = cross linking agent) by undergoing addition with the growing radical, or, in absence of monomers, can start the growth of the grafted chain.

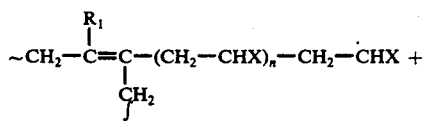

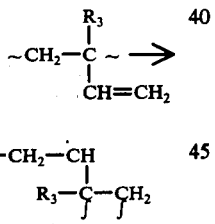

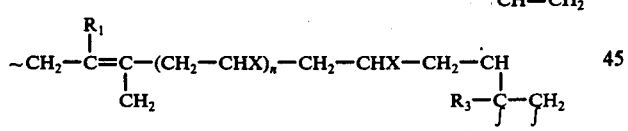

The copolymer radical formed by interaction of substrate monomer and elastomeric component of the adhesive can then undergo termination with the radicals formed out of the second substrate, and thus form a three-dimensional network.

The double bonds and other types of unsaturation existing in the first substrate, in the second substrate, and in the elastomeric component of the adhesive then react with the sulphur in the presence of a suitable accelerator to cross-link and cure the adhesive bond. The presence of peroxide in the graft initiator not only helps in generating Ag+ but also in producing rubber hydroperoxides which subsequently decompose to give rubber radicals and thus help in curing.

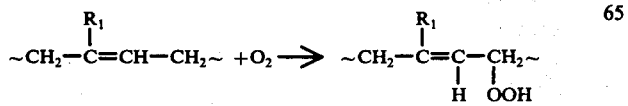

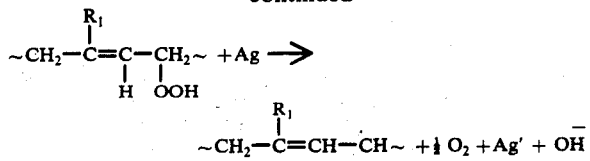

$$\sim CH_2-\overset{R_1}{\underset{|}{C}}=CH-CH\sim \; + \tfrac{1}{2} O_2 + Ag^+ + OH^-$$

A preferred recipe for an adhesive for use in the tire re-capping has the following components arranged in the following parts:

Part A: Components
1. Styrene Butadiene Rubber which is an elastomeric component and provides a vulcanisable matrix, compatible with both adherents and also capable of being grafted. Styrene Butadiene Rubber belongs to the broad generic class of diene elastomers, both synthetic and natural and can be replaced by natural rubber, polyisoprene, neoprene, chloroprene, nitrile rubber. Natural rubber and styrene butadiene rubber are the preferred components. This component should be present to the extent of 2 to 10% of the total weight, and the preferred amount is 5 to 7%.
2. Butadiene prepolymer with pendant vinyl groups (Lithene AM — produced by Lithium Corporation of America) which is an elastomeric component and is a vulcanisable matrix capable of undergoing graft polymerisation and cross-link formation and of providing tack. Lithene AM belongs to the broad generic group of diene prepolymers of molecular weight between about 1000 and about 2000 and can contain a varying amount of vinyl group. Different commercial products such as Poly-BD, (Arco Chemical Company), Hystl (Dynachem Corp.) can be substituted for Lithene AM. This component should be present to the extent of 2 to 5% and the preferred amount is approximately 3% of the total.
3. Carbon Black (vulcan #3 HAF — produced by Cabot Corp.), which is a reinforcing agent which improves mechanical properties of the adhesive layer, such as its modulus. Carbon Black belongs to the group of reinforcing fillers. Carbon blacks such as furnace black of various grades are preferred components. It should be present to the extent of 30 to 70 phr, where $r$ stands for the total of components 1 and 2 of this part.
4. Benzene, which is a solvent. Benzene belongs to the group of aromatic hydrocarbons. Zylene, toluene, and chlorobenzene can be substituted for benzene. Some chlorinated hydrocarbons such as ethylene dichloride and trichloroethylene can be used as a thinner. The amount may be adjusted depending on the molecular weight of components 1 and 2 of this part to give a sprayable formulation.

Part B: Components
1. Sulfur, which is a vulcanising agent to form cross-links between chains of the elastomeric components. The sulfur should be present to the extent of 2 to 5 phr. and the preferred amount is approximately 3 phr. Alternatively peroxide vulcanisation can be used.
2. Benzothiazyl disulfide, which is an accelerator for the reaction between the elastomer molecules and the sulfur. Sulfonamides, thiazoles and thiurams are other types of accelerators which can be substituted, alone or in combination. It should be present to the extent of 1 to 3 phr., the preferred amount being 1.5 phr.
3. Zinc oxide, which has a similar function to that of component 2 of this part.
4. Stearic acid, which enhances the reactivity of the zinc oxide. Some other zinc salts can be used but zinc oxide and stearic acid are preferred. Zinc oxide should be present to the extent of 4 to 10 phr. and the stearic acid be in the range of 1 to 3 phr. The preferred amount is about 5 phr. zinc oxide and 1.5 phr. stearic acid.
5. Antioxidant (Agerite — Stalite produced by R. T. Vanderbilt Company) which helps in preventing the oxidation of residual double bonds and other vulnerable sites present in the elastomeric component. Phenols such as styrenated phenols, alkylated phenols and polyphenols, amines such as phenyl$\alpha$-naphthylamine and phenyl$\beta$-naphthylamine, and some phosphites can be used in place of component 5. This should be present in the range of 0.5 to 3 phr., the preferred amount being about 1 to 1.5 phr.
6. Accelerator 808, which is an amine that enhances activities of components 1, 2, 3 and 4 of this part. It belongs to the group of fast migration type ultraaccelerators and is a condensation product of aniline and butyraldehyde. Other aldehyde-amine condensation products can be used in place of it. It can be present to the extent of 20 to 70 phr., and the preferred amount is 30 phr.

Part C: Components
1. Divinyl benzene, diallyl phthalate, divinyl ether of butane diol, ethylene glycol dimethacrylate, styrene, vinyl toluene, methyl styrene of a combination thereof, which is a monomer capable of being grafted and crosslinked. It should be present to the extent of 10 to 50 phr. of the elastomeric components, and the preferred amount is 20 phr. Styrene, vinyl toluene, p-chloro styrene and $\alpha$ methyl styrene can be used in place of divinyl benzene. Divinyl benzene and vinyl toluene or a combination of them are preferred. It should be present to the extent of 10 to 50 phr., and the preferred amount is 20 phr.
2. Cumyl peroxide. Cumyl peroxide belongs to the free radical type catalysts and can be replaced by a variety of peroxides, perbenzoates, peracetates and peroxy dicarbonates. Dicumly peroxide, cumene hydroperoxide and benzoyl peroxide are the preferred components. The peroxide concentration should be 1 to 10 phr. (ca. 0.1 to 1% of the total volume) and the preferred amount is about 5 phr.
3. Silver perchlorate. Silver Perchlorate is a graft initiator and should be present to the extent of 10 to 100 parts per million. The cumyl peroxide and silver perchlorate together form a graft initiator system which generates free radicals in the adherents and elastomeric components.
4. Methyl ethyl ketone, which is a solvent. This can be substituted by toluent, xylene, and methyl isobutyl ketone. MEK and toluene are preferred.

Figure 2:
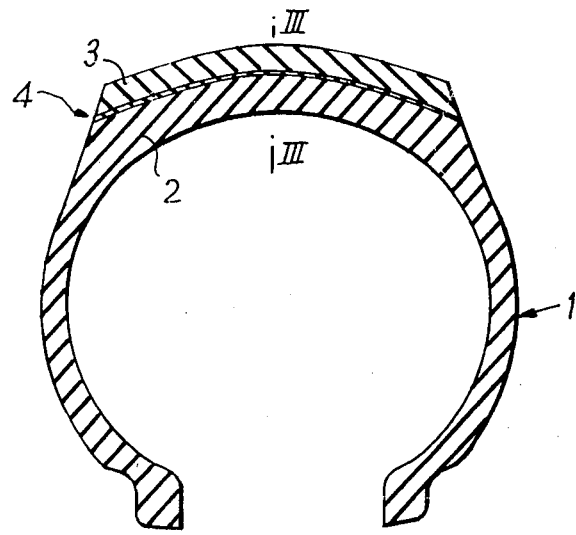
Figure 3:
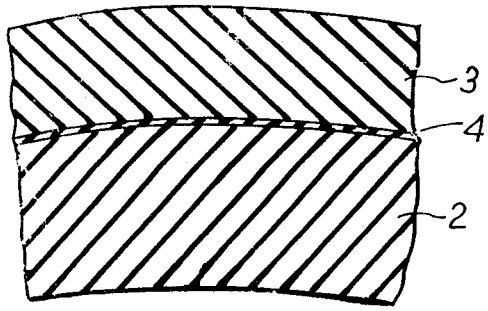

Further features of the invention will be apparent from the accompanying drawing, wherein:
FIG. 1 is a flow diagram of the process of preparing the adhesive of the present invention;
FIG. 2 is a transverse axial section of a re-capped automobile tire in which a new tread band is secured on a tire casing, utilising the adhesive of the present invention;
FIG. 3 is a partial radial section, to an enlarged scale, taken on the line III—III of FIG. 2.

Referring to FIG. 1, the starting constituents, the secondary constituents, and the tertiary constituents are preferably used in the proportions given in the following Examples of adhesives for tire re-capping.

EXAMPLE I

| Part A | (Starting constituents) | |
|---|---|---|
| | Styrene Butadiene Rubber (10% soln. in Benzene) | 70.0 gms |
| | Butadiene prepolymer with pendant vinyl groups (Lithene AM) | 3.0 |
| | Carbon Black (Vulcan 3HAF) | 4.50 |
| | Benzene | 22.50 |
| | | 100.00 |
| Part B | (Secondary constituents) | |
| | Sulfur | 0.25 |
| | Benzothiazyldisulfide | 0.15 |
| | Zinc Oxide | 0.50 |
| | Stearic Acid | 0.10 |
| | Antioxidant (Agerite Stalite) | 0.15 |
| | Accelerator 808 | 3.00 |
| | Toluene | 40.85 |
| | | 45.00 |
| Part C | (Tertiary constituents) | |
| | Divinyl benzene | 2.0 |
| | Cumyl peroxide | 0.1 |
| | Silver perchlorate (0.1% soln. in MEK) (graft promoter) | 0.4 |
| | MEK | 2.5 |
| | | 5.0 |

The 10% solution of rubber in benzene is mixed with Lithene AM and carbon black and ground in a steel ball mill for about 16 hours. Then the remaining ingredients of parts A and B are mixed and ground in the ball mill for an additional 2 to 3 hours. At this stage monomer, catalyst and graft promoter, etc. (part C) are added and thoroughly mixed to make the adhesive solution.

EXAMPLE II

| Part A | | |
|---|---|---|
| | Natural Rubber | 3.3 grams |
| | Styrene Butadiene Rubber#7.5 made by Firestone. | 7.5 |
| | Carbon Black Vulcan#3 HAF | 4.0 |
| | Sulfur | 0.48 |
| | Zinc oxide | 0.8 |
| | Mercapto Benzothiazole | 0.16 |
| | Agerite | 0.16 |
| | Benzene | 111.60 |
| | Accelerator 808 | 4.00 |
| Part B | | |
| | Divinyl Benezene | 2.7 grams |
| | Cumene Hydroperoxide | .5 |
| | Silver Perchlorate Solution (0.1% in MEK) | .3 |

EXAMPLE III

| Part A | | |
|---|---|---|
| | Styrene Butadiene Rubber#1502 | 3.5 grams |
| | Diene 35 NF | 3.5 |
| | Hystil c - 1000 | 3.0 |
| | Carbon Black, Vulcan#3 HAF | 4.0 |
| | Benzene | 86.0 |
| Part B | | |
| | Sulfur | 0.25 grams |
| | Mercapto benzothiazole | 0.1 |
| | Zinc oxide | 0.5 |
| | Agerite | 0.1 |
| | Toluene | 49.05 |
| Part C | | |
| | Divinyl benzene | 2.7 grams |
| | Cumene hydroperoxide | .5 |
| | Silver perchlorate Solution | |

-continued

| | |
|---|---|
| (0.1% in MEK) | .3 |

Comparative peel tests were carried out, on both (i) part of a tire casing rasped in the conventional manner, and (ii) part of a knife-cut smooth tire casing, utilising first a standard industrial adhesive, and then the adhesive of the present invention formulated in the manner given in Example I, II and III.

The standard industrial adhesive used as a control was Orbibond cement distributed by AMF VOIGHT of Santa Ana, California. The composition is not known, but conventionally recapping cement is a solution of natural or synthetic rubber containing various rubber compounding ingredients such as sulfur, carbon black, zinc oxide, stearic acid, and accelerator, but not containing any monomer or graft initiator.

The test procedure was as follows:

Two pieces, each measuring 1 by 5 inches were cut from (a) an abraded tire casing, and (b) an unabraded tire casing.

The abraded piece was cleaned by filing, and the unabraded piece was cleaned with toluene.

Adhesive was smeared on the surface of the two pieces with the help of a glass rod.

Then un-cured pieces of rubber, of the same size (1 by 5 inches) were each brought into contact with the adhesive-covered surface of one of the test tire pieces.

The sandwiches so formed were pressed together, whilst positioned side by side in a mould under the following conditions:

Pressure: 2000 lb. apparent (80-200 lb per square inch actual)
Temperature: 300° F
Time: 50 minutes After pressing, the samples were removed and allowed to condition overnight.

The same procedure was carried out using the control adhesive and the adhesives of the Example I, II and III, and the conditioned sandwiches were placed individually in a machine which measured the force required to cause peeling of one piece of the sandwich from the other. The force required, in pounds per square inch, for each test is shown in the following table:

| | (Control) Industrial Adhesive | Example I | Example II | Example III |
|---|---|---|---|---|
| Peel test on piece of rasped tire | 70-75 | 90-100 | 85-95 | 80-90 |
| Peel test on piece of smooth-cut tire | 50-55 | 80-85 | 70-72 | 50-62 |

Referring now to FIGS. 2 and 3, a motor vehicle tire 1 has a tire casing 2 and a tread band 3 secured together by an interposed layer 4 of adhesive. The cured layer 4 includes elastomeric material which is molecularly grafted by polymerised monomer or prepolymer with the elastomeric material of the tire casing 2 and with the elastomeric material of the tread band 3, such that the layer 4 is an integral part of the assembly and the tread band 3 is secured on the tire casing 2 with a higher degree of adhesion than is obtainable with known surface adhesives. Accordingly, there is no need to roughen the surfaces of the tire casing or of the tread band before applying adhesive, and the surface of the tread band may be a smooth surface resulting from knife cutting of a worn tire, to remove the worn tread band.

The treatment of a tire may be performed as follows:

The adhesive of the invention would normally be formulated in sprayable consistency. If it is too thick for a spraying operation, it is thinned with an adequate quantity of an aromatic solvent; e.g. toluene or a solvent blend which duplicates the solvency of toluene.

If the tire has been cut freshly, it is sprayed directly with the adhesive. If the cut tire has been stored for a long time before re-capping, to obtain best results, the tire surface is cleaned by wiping off with an aromatic solvent.

After spraying the cut tire with adhesive, the solvent is allowed to evaporate before covering it with the re-capping material. About 5-10 minutes is allowed for the solvent to evaporate.

Recommended curing conditions are:
Temperature: 275°-300° F.
Pressure: 175-200 lb/sq.in
Time of Cure: 50-60 minutes

We claim:

1. An adhesive, for bonding a first elastomeric substrate to a second elastomeric substrate, comprising:
   i. elastomer
   ii. prepolymer
   iii. graft initiator, having the following constituents in parts by weight:

| | |
|---|---|
| Styrene butadiene rubber | 70.00 |
| Butadiene propolymer having pendant vinyl groups | 3.00 |
| Carbon black | 4.50 |
| Benzene | 22.50 |
| Sulfur | 0.25 |
| Benzothiazyldisulfide | 0.15 |
| Zinc oxide | 0.50 |
| Stearic acid | 0.10 |
| Antioxidant | 0.15 |
| Accelerator | 3.00 |
| Toluene | 40.85 |
| Divinyl benzene | 2.00 |
| Cumyl peroxide | 0.10 |
| Silver perchlorate | 0.40 |
| Methyl ethyl ketone | 2.50 |

2. The adhesive of claim 1 wherein the accelerator is selected from the group consisting of mercaptobenzothiazole and thiuram disulfides.

3. The process for producing the adhesive of claim 1 which comprises the steps of:
   a. preparing a solution of the styrene butadiene rubber in the benzene
   b. mixing said solution with the butadiene prepolymer and carbon black
   c. grinding said mixture
   d. adding to said ground mixture the
      sulfur
      benzothiazyldisulfide
      zinc oxide
      stearic acid
      antioxidant
      accelerator
      toluene
      and mixing and grinding
   e. adding to the product of stage (d) the
      divinyl benzene
      cumyl peroxide
      silver perchlorate
      methyl ethyl ketone
      and mixing.

* * * * *